US007277982B2

(12) United States Patent
Calvignac et al.

(10) Patent No.: US 7,277,982 B2
(45) Date of Patent: Oct. 2, 2007

(54) DRAM ACCESS COMMAND QUEUING STRUCTURE

(75) Inventors: Jean L. Calvignac, Cary, NC (US); Chih-jen Chang, Apex, NC (US); Gordon T. Davis, Chapel Hill, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 10/899,937

(22) Filed: Jul. 27, 2004

(65) Prior Publication Data
US 2006/0026342 A1 Feb. 2, 2006

(51) Int. Cl.
*G06F 12/00* (2006.01)
(52) U.S. Cl. .......................................... 711/105; 711/5
(58) Field of Classification Search ...................... None
See application file for complete search history.

(56) References Cited

U.S. PATENT DOCUMENTS

| | | | | |
|---|---|---|---|---|
| 5,327,570 | A | 7/1994 | Foster et al. ................. | 395/800 |
| 5,937,428 | A | 8/1999 | Jantz ............................ | 711/114 |
| 6,137,807 | A * | 10/2000 | Rusu et al. ................... | 370/429 |
| 6,260,099 | B1 | 7/2001 | Gilbertson et al. ......... | 720/240 |
| 6,523,036 | B1 | 2/2003 | Hickman et al. ............. | 707/10 |
| 6,526,462 | B1 | 2/2003 | Elabd ........................... | 710/242 |
| 6,532,509 | B1 | 3/2003 | Wolrich et al. .............. | 710/240 |
| 6,539,487 | B1 * | 3/2003 | Fields et al. ................. | 713/340 |
| 6,731,559 | B2 * | 5/2004 | Kawaguchi et al. ......... | 365/222 |
| 2003/0070055 | A1 | 4/2003 | Johnson et al. .............. | 711/202 |

OTHER PUBLICATIONS

IBM Technical Disclosure Bulletin, vol. 33, No. 12, May 1991, "Processor/Memory Switch Which Maintains the Temporal Ordering of Requests", pp. 293-296.

* cited by examiner

*Primary Examiner*—Mano Padmanabhan
*Assistant Examiner*—Thanh D. Vo
(74) *Attorney, Agent, or Firm*—Joscelyn G. Cockburn; James A. Lucas; Driggs, Hogg & Fry Co., LPA

(57) ABSTRACT

Access arbiters are used to prioritize read and write access requests to individual memory banks in DRAM memory devices, particularly fast cycle DRAMs. This serves to optimize the memory bandwidth available for the read and the write operations by avoiding consecutive accesses to the same memory bank and by minimizing dead cycles. The arbiter first divides DRAM accesses into write accesses and read accesses. The access requests are divided into accesses per memory bank with a threshold limit imposed on the number of accesses to each memory bank. The write receive packets are rotated among the banks based on the write queue status. The status of the write queue for each memory bank may also be used for system flow control. The arbiter also typically includes the ability to determine access windows based on the status of the command queues, and to perform arbitration on each access window.

7 Claims, 5 Drawing Sheets

Access Request Command Queuing Structure

Access Window Examples

Access Window Examples

Extended Access Window Examples

DRAM ACCESS COMMAND QUEUING STRUCTURE

FIELD OF THE INVENTION

This invention relates to the field of computer memory access, with particular reference to command queuing methods and structures for DRAM memory access.

BACKGROUND OF THE INVENTION

A number of functional units are utilized by a network processor to manage the flow of data. Among these are memory interfaces to provide memory arbitration; state machines to provide functionality of processing command messages; and receive, transmit and dispatch controllers, just to name a few. A memory interface attempts to provide buffer management and data movement at media speed. To eliminate the memory access bandwidth bottleneck, the main function of the memory interface is to provide an efficient memory access scheme while meeting the requirements of sustained data throughput at the required data rate at the memory controller interface to the memory device.

Network traffic management requires hardware implementation for scheduling the delivery of network packets, and for traffic shaping. For this, a computer employs a scheduler which is a computer program designed to perform advanced scheduling algorithms to control functions, such as network packet scheduling, traffic shaping, and initiation and termination of specified tasks. Hardware schedulers contain a plurality of network interface and switch ports, an internal memory for DRAM write access command queues as well as buffers for received packets, an internal memory for DRAM read access command queues and finite state machines for memory management. The system utilizes external SRAM and DRAM memory devices to store control blocks of scheduling elements. It is necessary to be able to quickly and accurately execute searches for programs with complex flow patterns.

A number of features are found in related art devices, but none of these devices embody the combination of features that are found in the present invention. For example, some conventional DRAM access arbiters consider only one access request across several memory banks at a time, thereby leading to low memory bandwidth utilization. Other DRAM access arbiters employ schemes to increase the memory access bandwidth, but access command queues are global queuing structures which contain access requests to all the memory banks of the memory device.

Neither of these schemes imposes any limitation on how many access requests for the same memory bank can be presented in the command queues. The command queues can be populated with access requests to the same memory bank. Command queues are limited resources, such that new access requests for different memory banks cannot be inserted into the command queues while these queues are full. This problem results in low memory bandwidth utilization for a period of time.

In some applications where a "cut-and-paste" processing model is used, the "paste" of a packet header also contributes to the write accesses traffic to the memory. In this case, flow control on the regular write access traffic is required in order to guarantee that the "paste" operation of packet data is given the highest priority to access the memory devices.

BRIEF DESCRIPTION OF THE INVENTION

One of the objects of the present invention is to solve the problems associated with the above schemes. This is achieved by use of one or more arbiters to maximize the memory bandwidth available for the read and the write operations by avoiding consecutive accesses to the same memory bank and associated dead cycles.

This objective is accomplished by the use of a system and a method for (1) dividing the access requests across several memory banks into access requests per memory bank. Each memory access to a certain memory bank is independent from accesses to other memory banks; thus, memory access bandwidth can be optimized; (2) Providing queuing structure for access requests per memory bank; (3) Preventing accesses to a certain memory bank from occupying the whole command queue by imposing a threshold per memory bank access request queue such that memory access bandwidth will not be degraded; (4) Using bank rotation for writing receive packet to memory based on the write queue status; (5) Providing a best fit for systems where multiple "users" access independently in different memory locations; and (6) Using the status of write queue per memory bank for flow control of the system.

The invention relates to a system and a method of maximizing DRAM memory access utilization wherein the DRAM memory consists of a plurality of memory banks. The method comprises first dividing DRAM accesses into write accesses and read accesses. The read and write access requests are further divided into accesses per memory bank. A configurable threshold limit is imposed on the number of accesses to each memory bank. The writing receive packets are rotated among the banks based on the write queue status. The status of the write queue for each memory bank may also be used for system flow control. The method also typically includes the additional steps of determining access windows based on the status of the command queues, and performing arbitration on each access window.

The invention also relates to an article of manufacture comprising a computer usable medium having a computer readable program embodied in said medium. The program when executed on a computer causes the computer to maximize access to DRAM memory using an arbiter that maximizes the memory bandwidth available for the read and the write operations by avoiding consecutive accesses to the same memory bank and associated dead cycles. The program causes the arbiter to divide DRAM accesses into write accesses and read accesses, to divide the access request into accesses per memory bank, to impose a threshold limit on the number of accesses to each memory bank, and to rotate the write receive packets among the banks, wherein the write packets are rotated among the banks based on the write queue status. The program can cause the arbiter to use the status of the write queue for each memory bank for system flow control. It can cause the arbiter to determine access windows based on the status of the command queues, and perform arbitration on each access window. In one embodiment, the memory banks are embedded in fast cycle random access memory devices.

These, as well as other objects and advantages, will become apparent upon a full reading and understanding of the present invention.

SUMMARY OF THE DRAWINGS

The present invention will now be described with specific reference to the drawings in which.

DETAILED DESCRIPTION OF THE INVENTION

A network processor scheduler is typically provided with sufficient memory access bandwidth to avoid bottlenecks and conflicts caused by different functional entities attempting to simultaneously access the same memory. This is done by using a combination of static random access memory (SRAM) and dynamic random access memory (DRAM) devices. The present invention is specifically concerned with the controlled access to DRAM memory useful for supporting high (e.g. 10 Gbps) data rates. For these high rates, a particularly useful memory device is a fast cycle dynamic random access memory (FCRAM chip), a double data speed fast cycle dynamic random access memory. (DDS FCRAM), or a reduced latency dynamic random access memory (RLDRAM). An FCRAM device is capable of delivering a random cycle time of 20 nanoseconds (ns) which is about 4 times faster than the speed of a conventional DRAM device. Another feature of the FCRAM is that it combines non-multiplexed addressing and complete address decoding and pipelining, thereby enabling both row and column address to be designated simultaneously, whereas with a conventional DRAM, there is a time lapse between these two activities.

In one embodiment, there are two FCRAM memory devices with one being the logical high part and the other the logical low part, with the two parts being generally transparent to the system software. Each FCRAM memory device contains four internal banks. A bank can be organized as a 4M×16-bits or 8M×8 bits format. The read and write access to each bank share the same bus. Each data chunk in the memory of the bank comprises 64 bytes, with 32 bytes in the high part and 32 bytes in the low part to achieve a wide bus. Typically, there is no need to read or to write both a high and a low in a given bank at the same time because the address buses of the high and low parts can be implemented independently.

As previously noted, the memory interface provides buffer management and data movement at media speed. To eliminate the memory access bandwidth bottleneck, the main function of the memory interface is to provide an efficient memory access scheme while meeting the requirements of sustained data throughput at the required data rate at the memory controller interface to the FCRAM memory device. This requires that a memory arbiter collect read requests from transmit FIFOs and write requests from receive FIFOs, and schedule efficient accesses to the memories. Because of hardware limitations, the access to FCRAM devices has the following timing constraints:

1. Consecutive accesses (read or write) to the same memory bank shall be spaced out by three dead memory cycles.

2. A write access following a read access shall be spaced out by two dead memory cycles to allow data bus turn-around. If the write operation is accessing the same memory bank as the previous read operation, one additional dead memory cycle is needed for a total of three dead cycles.

Figure 1:
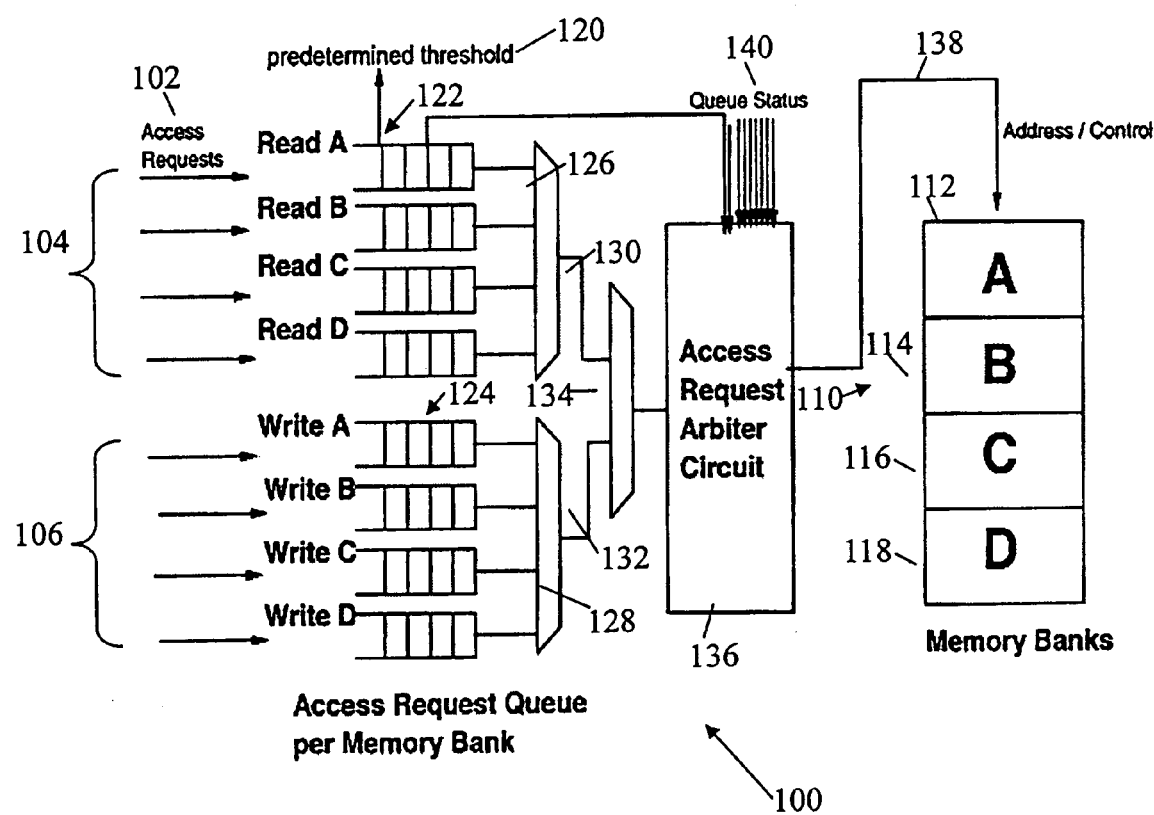
FIG. 1 shows a queuing structure for access request command.

In order to provide a better understanding of the invention, reference is made to the drawings, and particularly with respect to FIG. 1, wherein the queuing structure 100 is shown for handling multiple access requests 102 comprising read access requests 104 and write access requests 106. The requests are labeled read A, B, C and D and write A, B, C and D, and are specified for one of four memory banks 110 marked as banks A 112, B 114, C 116 and D 118. A predetermined threshold 120 is imposed on each of the read queues 122 and each of the write queues 124 by the software or hardware package. This threshold limit can be configured to the predetermined value at system initialization by means of software or hardware or a combination thereof. Each read request passes through the queue to multiplexer 126, and each write request passes through the queue to multiplexer 128. In turn, one read request 130 and one write request 132 are selected and are passed to the multiplexer 134, and either a write or a read request is selected by the arbiter circuit 136. The address of the selected request is then forwarded at 138 to one of the memory banks 110. The queue status is checked at 140 to determine the actual queue count or number of requests in each queue compared to the threshold limit of each queue. A queue count equal to zero represents an empty queue. A queue count greater than the predetermined threshold limit represents overflow status.

Figure 2:
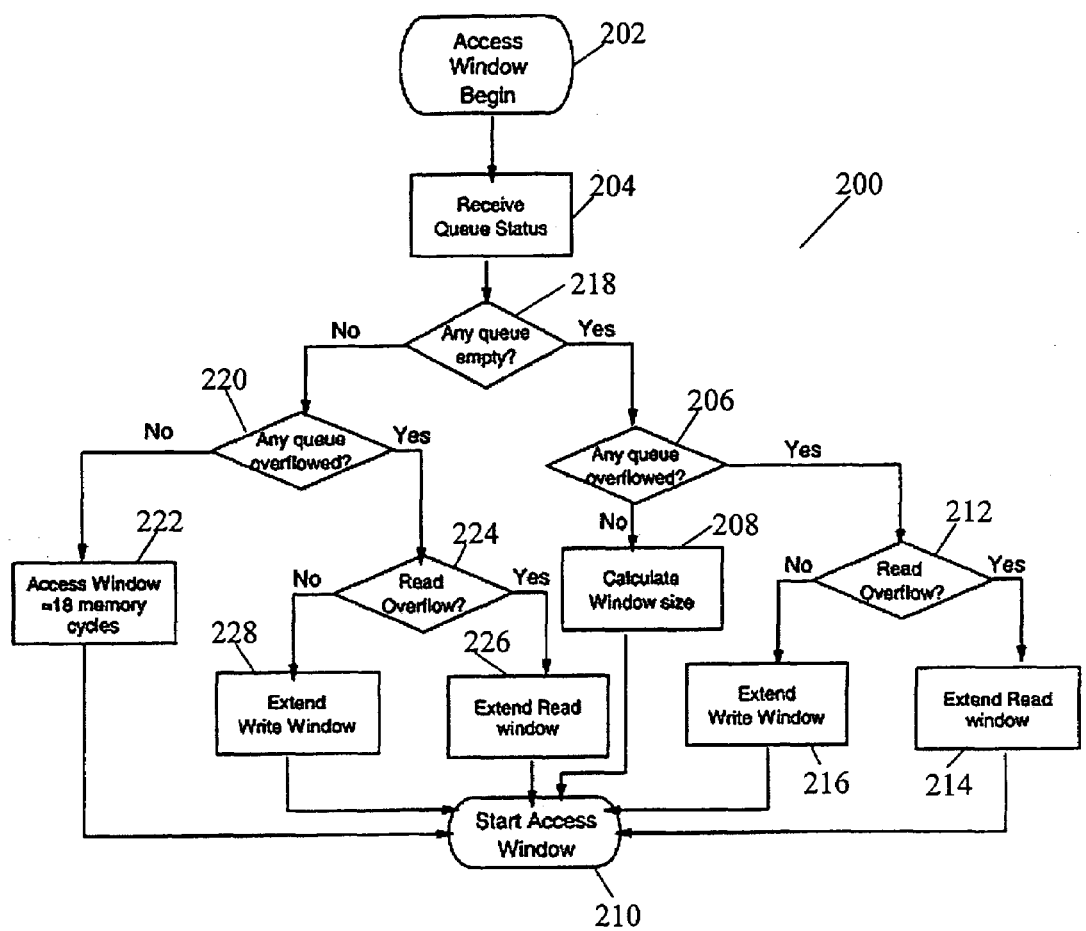
FIG. 2 is a decision flow chart for access window sizes.

According to one feature of the present invention, a decision flow chart 200 is shown in FIG. 2 for determining the sizes of access windows. The window access procedure starts at 202 when a queue status inquiry is received at 204. The first step in the decision process involves the determination at 218 as to whether any of the queues 122 or 124 in FIG. 1 is empty. If the answer is 'yes', the next question at 206 is whether any queue is overflowed. A 'no' response then results in the calculation of window size at 208 and, in turn, starts access window at 210. A 'yes' answer at 206 then triggers the next inquiry at 212 as to whether the overflow is in a read queue. If the response is 'yes', the read window is extended at 214. If the answer is 'no', then the size of the write window is extended at 216 to accommodate the overflow.

Returning to the queue status inquiry at 204, if the answer is 'no', thereby indicating that no queues are empty, the same question is asked at 220 as at 218, namely if any queue is overflowed. A 'no' answer then fixes the size of the access window at 18 memory cycles at 222 and the access window 210 is started. If, however, any queue is overflowed in response to the inquiry at 220, the 'read overflow' question at 224 is either answered 'yes' whereupon the read window is extended at 226 or 'no' whereupon the write queue is overflowed and the write window is extended at 228. Either way, the extended read or write window goes to the start access window at 210.

As can be readily seen from FIG. 2, there are a number of options that are available depending on the paths that are followed. FIGS. 3-9 show just a few of these possibilities.

Figure 3:
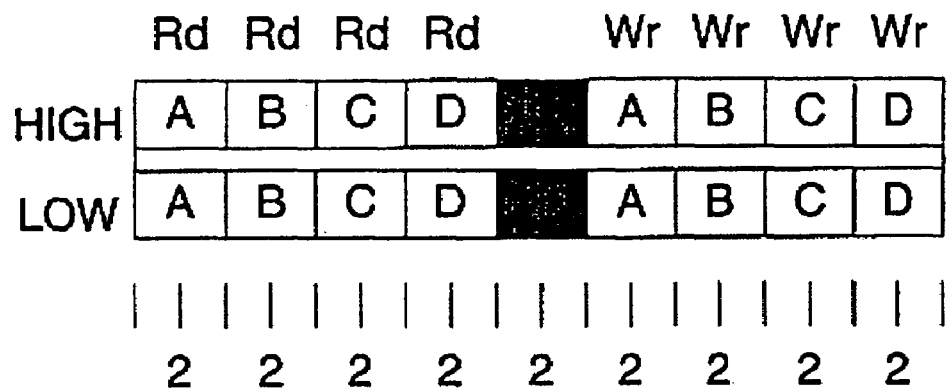
FIGS. 3-7 are examples of access windows.

Referring first to FIG. 3, the reading of packet data starts from memory bank A, and then successively from banks B, C and D. Then, the memory bus is turned around for the write access, starting from memory bank A, followed by banks B, C and D. The read and write accesses are completed in the access window of 18 memory cycles. For example, assume a required data rate of 10 Gbps in both receive (corresponding to memory write) and send or transmit (corresponding to memory read) directions. The available memory bandwidth for read and write access to eight DDR-FCRAM devices is based on an assumption of 51.2 Gbps at a clock cycle of five nanoseconds. At five ns per cycle, using 18 memory cycles, the bandwidth for the read operation is sustained at 51.2 Gbps while the corresponding bandwidth for the write operation is sustained at 22.75 Gbps, based on an assumption that each access contains 32 bytes of valid data. Two dead cycles between read and write are also shown in both the high and the low parts of the banks. In this example, banks A-D are read simultaneously in the high and low parts, and are written simultaneously in the high and low parts.

Figure 4:
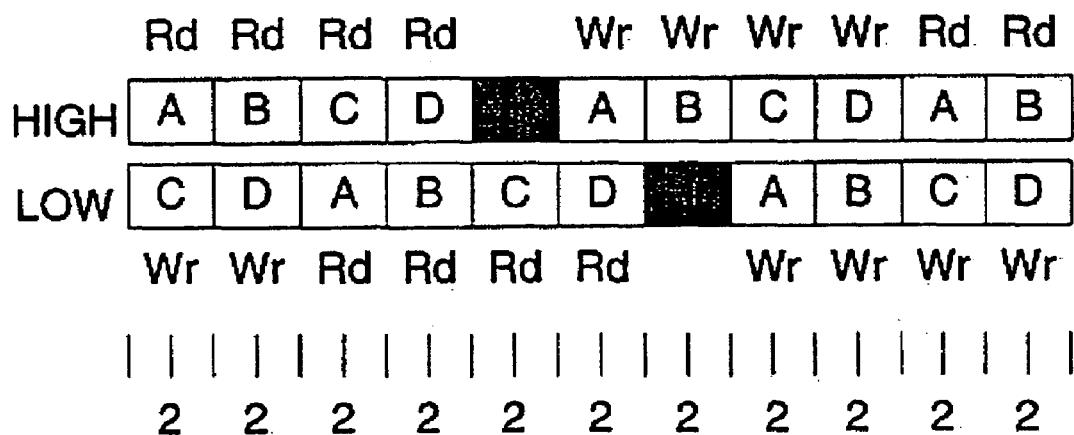

FIG. 4 shows that the access sequence to the memory banks of the high and low parts of the arbiter memory can be completely independent of one another. In this figure, there are two non-empty read request queues in the high part and two non-empty read request queues in the low part. As shown, write access is available in banks C and D in the low part, simultaneously with read access to banks A and B of the high part. Also, the high part of banks C and D can be read at the same time that the low part of banks A and B are being read. Also, it should be observed that the dead cycles in the low part do not necessarily occur simultaneously with those of the high part. It should also be noted that there is a dead time for a turn around when going from read to write, but that such a turn around time is not necessarily required when switching from write to read.

Figure 5:
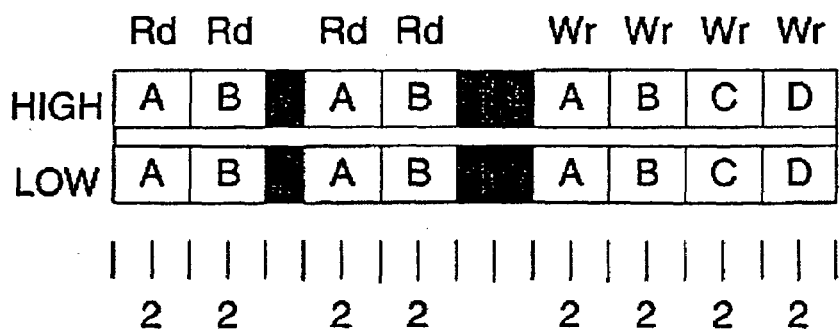
Figure 6:
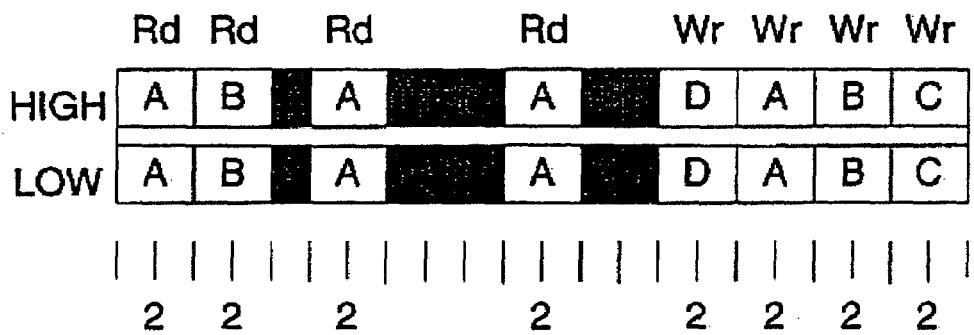
Figure 7:
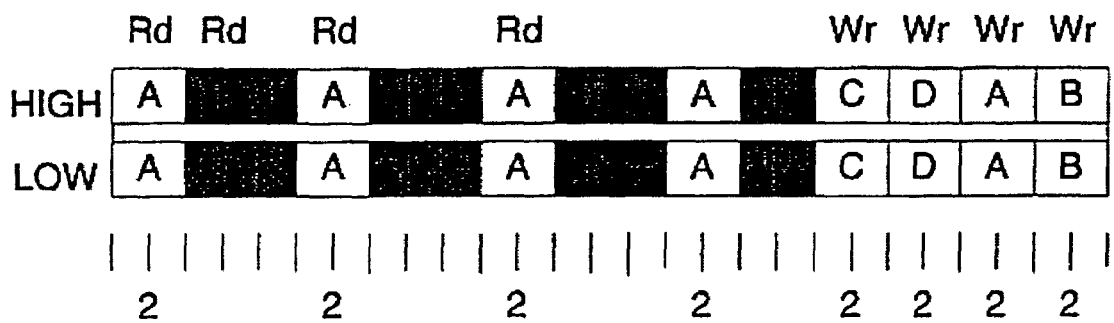

FIGS. 5-7 are samples of access windows where none of the queues has overflowed. It will be noted that both upper and lower parts of banks A-D are read or are written simultaneously.

Turning first to FIG. 5, a first data store analysis is shown in which the high part has two non-empty read request queues and four non-empty write request queues. The low part likewise has two non-empty read queues and four non-empty write queues. None of the queues as shown have exceeded the predetermined threshold.

FIG. 6 represents a second data store analysis similar to that of FIG. 5 but in which one of the non-empty read request queues in the high part and one of the non-empty read request queues in the low part have a significantly higher number of requests than the other two non-empty read request queues. In this scenario, the total memory cycles required to complete eight read and eight write accesses are 22 cycles, resulting in a decrease in the data throughput of both the read and the write accesses.

A third example of a data store access analysis is shown in FIG. 7. In this case, there is only one non-empty read request queue in the high part, one non-empty read request in the low part, eight non-empty write request queues in the high and the low parts, and none of the request queues have exceeded the predetermined threshold. In this scenario, the access windows contain 32 memory cycles to complete eight read and eight write accesses. This requires a total of 27 cycles to complete the accesses.

Figures 8, 9, 10:
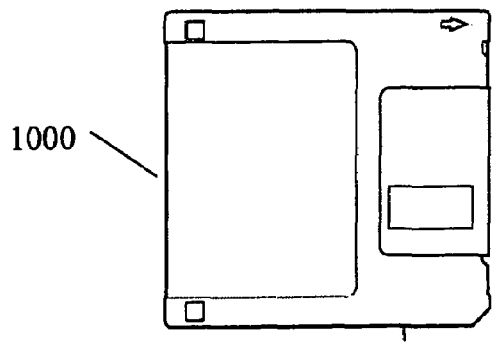
FIGS. 8-9 are examples of extended access windows.
FIG. 10 shows a floppy disc, indicative of a computer-readable medium for carrying out the steps of the present invention.

By its very nature, network traffic tends to be bursty. To accommodate the peak bandwidth requirement, it is desirable to extend either the read or the write access window as shown in FIGS. 8 and 9. The present invention embraces that capability.

FIG. 8 allows for additional write accesses by extending the window. If the number of write requests has exceeded the predetermined threshold, while all of the non-empty read request queues are below the threshold, the arbiter will extend the access window by another eight memory cycles to accommodate the demand for more accesses.

If the number of read requests exceeds the predetermined threshold, while all of the non-empty write request queues are below the threshold, the arbiter will extend the access window by another eight memory cycles to accommodate the increased number of read requests. This is shown in FIG. 9.

The net result of the present invention is that the arbiter maximizes the memory bandwidth available for the read and the write operations by avoiding consecutive accesses to the same memory bank and associated dead cycles.

FIG. 10 shows a computer-readable medium in the form of a floppy disc 1000 for containing the software implementation of the program to carry out the various steps of project management according to the present invention. Other machine readable storage mediums are fixed hard drives, optical discs, magnetic tapes, semiconductor memories, such as read-only memories (ROMs), programmable read-only memories (PROMs), etc. The article containing this computer readable code is utilized by executing the code directly from the storage device, or by copying the code from one storage device to another storage device, or by transmitting the code on a network for remote execution. The computer program may be loaded into the memory to configure and to run the program herein described and claimed for execution. The computer program comprises instructions which, when read and executed by the system, perform the steps necessary to execute the steps or elements of the present invention.

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program instructions or a computer program in the present context mean any expression, in any language, code (i.e., picocode instructions) or notation, of a set of instructions intended to cause a system having an information processing capability to perform a particular function either directly or after either or both of the following occur: (a) conversion to another language, code or notation; (b) reproduction in a different material form.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A system that is useful for maximizing access to DRAM memory stored in memory banks, including a computer-based arbiter that contains features for maximizing the memory bandwidth available for read and write operations by avoiding multiple access requests above a predetermined threshold to the same memory bank and by minimizing dead cycles, by, dividing DRAM accesses into write accesses and read accesses;

dividing the access requests into accesses per memory bank;

imposing a threshold limit on the number of accesses to each memory bank;

rotating the write receive packets among the banks, based on the write queue status;

using the status of the write queue of each memory bank for system flow control;

determining access windows based on the status of command queues, and performing arbitration on each access window.

2. The system according to claim 1 wherein the arbiter performs its functions on fast cycle DRAMs.

3. The system according to claim 1 wherein the threshold limit on the consecutive accesses per bank is configurable.

4. An article of manufacture comprising a computer usable medium having a computer readable program embodied in said medium, wherein the computer readable program, when executed on a computer, causes the computer to maximize access to DRAM data memory stored in memory banks, including the use of an arbiter that avoids consecutive access requests above a predetermined threshold to the same memory bank, and that minimizes dead cycles by a) dividing DRAM accesses into write accesses and read accesses;

b) dividing access request into accesses per memory bank;

c) imposing a threshold limit on the number of accesses to each memory bank;

d) rotating the write of contiguous data among the banks based on the write queue status;

e) using the write queue status for each memory bank for system flow control; and f) determining access windows based on the status of the command queues, and performing arbitration on each access window.

5. The article of manufacture according to claim 4 wherein the program causes the arbiter to command memory banks embedded in fast cycle dynamic random access memory devices.

6. The article of manufacture according to claim 4 wherein the program controls the configuration of the threshold limit on the consecutive accesses per bank.

7. The article of manufacture according to claim 4 wherein the contiguous data that is rotated among the banks by the arbiter consists of receive packets.

* * * * *